Seymour & Taylor.
Hay Spreader.
Nº 67221.     Patented Jul. 30, 1867.

Witnesses
Chas H Poole
D B Reuter

Inventor
E. E. Seymour
S. J. Taylor
By their atty
R. D. O. Smith

United States Patent Office.

E. E. SEYMOUR AND S. J. TAYLOR, OF ROME, NEW YORK.

Letters Patent No. 67,221, dated July 30, 1867.

---

IMPROVEMENT IN COMBINED HORSE-RAKE AND HAY-SPREADER.

---

The Schedule referred to in these Letters Patent and making part of the same.

---

TO ALL WHOM IT MAY CONCERN:

Be it known that we, E. E. SEYMOUR and S. J. TAYLOR, of Rome, in the county of Oneida, and State of New York, have invented a new and useful Combined Hay-Rake and Tedder; and we do hereby declare the following to be a full, clear, and exact description of the same, reference being had to the accompanying drawings, in which—

Our invention consists in an improved hay-rake and tedder combined, whereby all the advantages of each are obtained from one machine.

That others may understand the construction and operation of my invention, we will proceed to particularly describe it.

Figure 1:
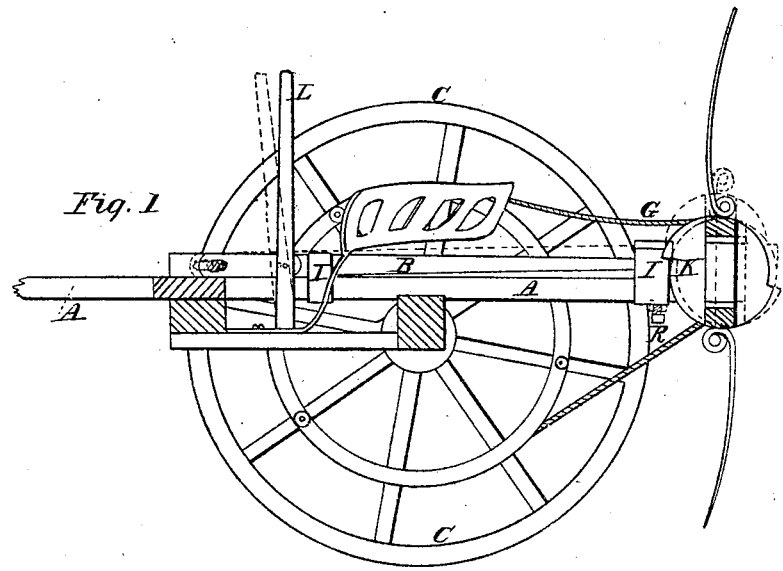
Figure 1 is a side elevation of our hay-rake and teddar one wheel being removed to show the parts.
Figure 2:
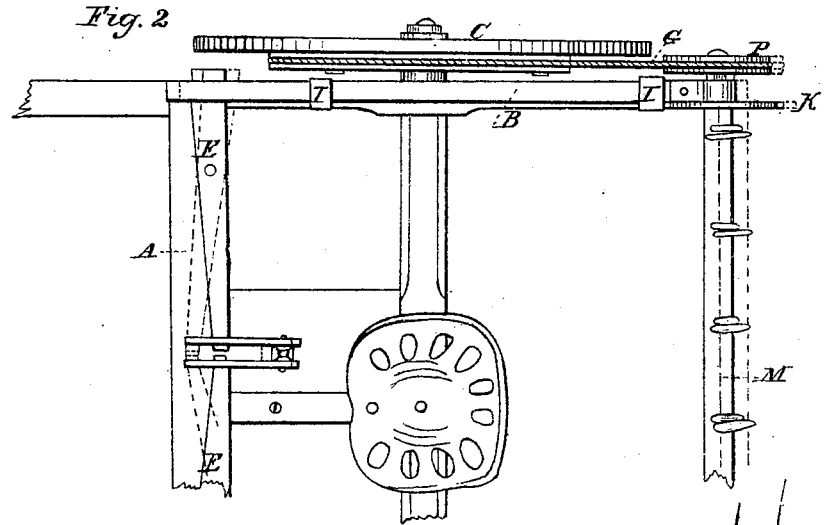
Figure 2 is a plan of the same.
Figure 3:
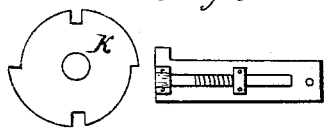
Figure 3 is a view of the cam-wheel and stop.
Figure 4:
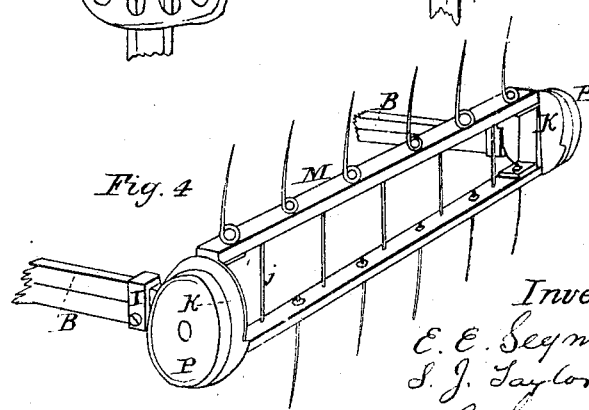
Figure 4 is a perspective view of the rake-head.

In fig. 1, A is the main frame of the machine, made as represented, and by which the whole is drawn, a suitable tongue or shaft being attached for that purpose. On this main frame, at suitable places, are attached the guides I I, in which the arms B B of the rake-head slide freely backwards and forwards. They are controlled and kept in any desired position by the two levers E E connected with the lever L. The rake-head is shown in fig. 4, and consists of two pieces of wood, or other material of suitable length and size, connected by the rods j j, and securely fastened at the ends to a cam-wheel, K. The teeth of the rake or tedder are inserted in holes in the frame at proper distances apart, and securely fastened by screw-nuts or otherwise. A solid shaft might be employed in the place of the frame described and shown, but we prefer the frame because it is cheaper and not so heavy. The cam-wheel K is so attached to the rake-head so that when in use as a raker it shall hold the head in a suitable position for gathering the hay or grain, and when desired, it may be released, allowed to perform a half revolution, and be again retained by the use of the lever L. The cam-wheel K in its revolution is made to stop and hold the rake-head, at the pleasure of the driver, by means of a stop upon the rear ends of the main frames, and this stop may be either permanent or movable. The rake-head M revolves upon journals which rest in boxes or eyes at the rear ends of the arms B B, and to the ends of these journals are firmly secured the pulleys P P. Attached to the inner side of the spokes of the wheel C is a grooved ring, by means of which motion is communicated from said wheel to the rake-head M, when it is used as a tedder. This grooved ring is secured by clamps to the spokes, and is easily removed and replaced as occasion requires, so that the wheels of the farm-wagon may, if necessary, be used with the rake and tedder, and the first cost of the machine materially reduced. The rear guides are made longer than the forward ones in order to allow the rake-head to accommodate itself to any inequalities of the ground, and the arms B B carrying the rake-head may be adjusted by means of screws passing through the main frame A, and bearing on a plate on the under side of the said arms to accommodate the rake-head, when the front ends of the shaft are held high or low, by using therewith a tall or low base. When used as a tedder the pulleys are connected by the band, and as the machine is drawn over the ground the rake-head is caused to rotate rapidly, taking up and scattering the grass in the most perfect manner. The band G is kept tight upon the wheels by the action of the lever L, causing the rake-head to be forced backward, thereby increasing the tension sufficiently, and when not in use the pressure is relaxed and the head remains stationary. While being transported from one field to another or elsewhere, as required, the rake-head may be secured with the teeth projecting horizontally so as to be free from liability of damage from obstructions in the road by any suitable or convenient locking device which will prevent a movement in either direction. When used as a raker the band G may be removed, though in sliding the rake-head forward far enough to bring the cam-wheels in connection with the stop, the band will be so slack as not to revolve the rake. When the driver pulls the lever L towards him the rake-head is brought forward sufficiently far to be caught and held by the cam-wheel K, until the hay is ready to be deposited in the row, when by releasing the strain upon the lever the head is released, the hay is deposited in its place, and with a half revolution it is again ready for raking. The lever L may be retained in any desired position by a holding device of any convenient construction placed within reach of the driver's hand or foot.

Having thus described our invention, what we claim as new, and desire to secure by Letters Patent, is—

1. A revolving rake provided with a driving-band and with stops K, or their equivalents, so that the implement may be adjusted to be used as a rake or as a tedder, as may be desired, by sliding the rake-head toward or away from the driving-wheel, as and with the effect set forth.

2. The revolving rake-head M, mounted in bearings at the ends of the sliding-arms B B, so that the same movement by which the rake-head is brought in contact with the stops will loosen the band G, and it will cease to operate the rake.

3. In combination with the rake-head M, and sliding-bars B B, the levers E E, and L, substantially as and for the purposes set forth.

4. In combination with the arms B B, and guides I I, the adjusting-screws R R, substantially as and for the purpose set forth.

E. E. SEYMOUR,
S. J. TAYLOR.

Witnesses:
S. S. LEWIS,
O. HUMERTON.